Patented June 10, 1941

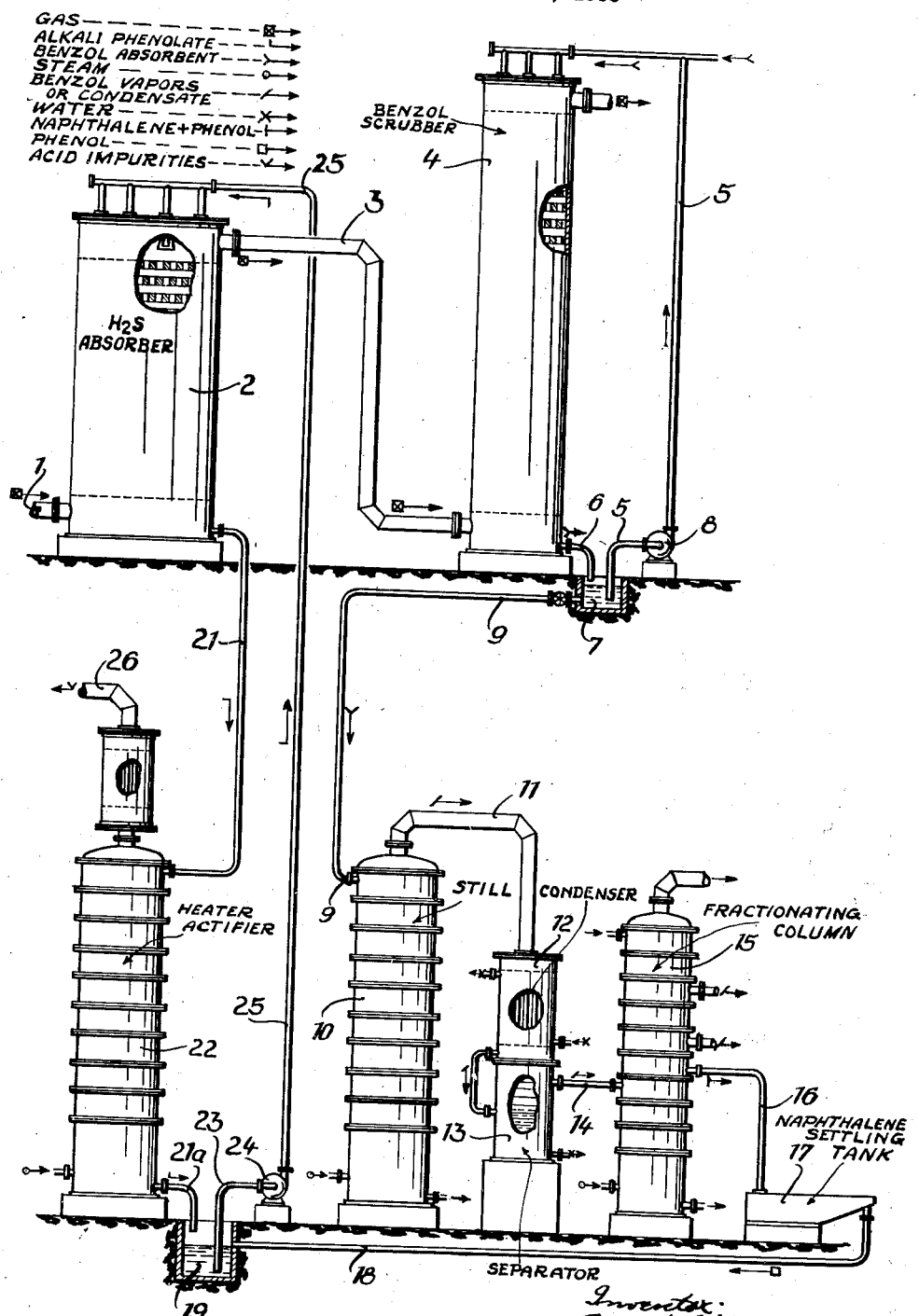

2,244,731

UNITED STATES PATENT OFFICE 2,244,731

PROCESS FOR REMOVAL OF ACIDIC IMPURITIES FROM FUEL GAS

Adolf Schmalenbach, Essen, Germany, assignor, by mesne assignments, to Koppers Company, Pittsburgh, Pa., a corporation of Delaware Application November 8, 1938, Serial No. 239,498
In Germany November 11, 1937

3 Claims. (Cl. 23—3)

The present invention relates to the removal of hydrogen sulphide and other acid impurities such as carbon dioxide from coke oven gas or illuminating gas or other gases containing benzol and/or homologues by washing the gas to be purified with an aqueous alkaline solution of phenols.

It is known how to treat gases to remove hydrogen sulphide or other impurities therefrom with an aqueous alkaline solution of phenols.

It has been found that the phenols used in the ordinary alkaline phenolate solutions adopted for the gas desulphurization are not completely fixed to the alkali, or only in a comparatively loose manner, so that the washing solution possesses a certain phenol vapour pressure. This phenol vapour pressure is rather low with the fresh washing solution, but it increases with the absorption of hydrogen sulphide, carbon dioxide or the like. If large amounts of gas come into contact with the washing solution, as it happens for instance during the removal of hydrogen sulphide and the like from coke oven gas or illuminating gas, a part of the phenols passes over into the gas and the washing capacity of the liquid is correspondingly decreased. The losses of phenols thus caused may be quite considerable in larger plants and with large quantities of gas.

The main object of my present invention is to provide such improvements which will insure that the efficiency of the gas desulphurization process, when carried out with alkaline solutions of phenols, is maintained by recovering the phenols from the gas and returning the phenols to the washing liquid.

The present invention now consists in that the gases to be treated after their washing with an alkaline solution of phenols, are scrubbed with a purified oil, for instance a tar oil fraction as used in the benzol factory, in such a manner that the benzol, homologues and also the phenols that pass over into the gas from the phenolate solution, are absorbed from the gas, and that thereafter the phenols thus absorbed are separately recovered in the benzol factory and finally returned in a pure or concentrated state to the washing liquid.

The recovery of phenols from the wash oil according to the present invention is effected for instance in such a way that first of all the naphthalene is extracted from the naphthalene oil fraction by crystallising out, the phenols being removed from the mother liquor by means of a sodium hydroxide solution.

In order to be able to recover a phenol concentrated as much as possible, an intermediate fraction may also be distilled out between the benzol and its homologues and the naphthalene oil fraction if the wash oil is distilled according to the present invention. In this intermediate fraction, the phenol is highly enriched so that a considerably concentrated alkaline solution of phenols may be recovered.

The scrubbing of the gas by a wash oil is preferably done after the desulphurization of the gas. In this way all the phenol evaporated from the phenolate solution is easily recovered.

If the gas desulphurization takes place after the removal of the benzol, the gas according to the present invention is washed with oil after the scrubbing with an alkaline solution of phenols, in order to remove the phenol vapours absorbed from the gas, whereupon the wash oil containing phenol is suitably led through the benzol scrubber if necessary in circulation so that the phenols may be obtained in the above described manner, recovering benzol and other constituents from the wash oil.

According to the invention the phenols are preferably recovered from the enriched wash oil in such manner that the wash oil is first of all freed by steam distillation from the substances absorbed from the gases whereby a distillate consisting of a part of the wash oil and the absorbed substances may be condensed, such condensate being called usually "primary product." The primary product also contains the phenols absorbed from the gas and it is possible to recover the phenols in pure or concentrated form from the primary product by fractional distillation or by other suitable methods.

Still further objects and features of my present invention may be taken from the following description of a preferred embodiment thereof and from the accompanying drawing which illustrates schematically a plant for carrying out the process according to my invention.

The gases to be treated enter the purifying apparatus 2 through the pipe 1 wherein the gas is brought into intimate contact with an alkaline solution of phenols. The gases are thereby freed from acidic impurities such as hydrogen sulphide, carbon dioxide and the like.

The gases leave the H₂S absorber apparatus 2 through the pipe 3 and enter the benzol washing apparatus or scrubber 4 wherein the gases are treated with a suitable benzol absorbent such as tar oil or straw oil in order to recover the benzol and other valuable substances from the gas. In the apparatus 4 the phenols which may escape from the washing liquid in apparatus 2 are also absorbed. The benzol absorbent is circulated through the pipe 5, apparatus 4, pipe 6 and tank 7 by means of the pump 8.

A part of the enriched absorbent is drawn off from the tank 7 through the pipe 9 to a still 10 in which the absorbent undergoes a steam distillation. The vapours escape from the still 10 through the pipe line 11 and enter a condenser 12, the condensate being introduced into the separator 13 where oily matter and water separate. The oily condensate is passed from the separator 13 through pipe 14 to a fractionating column 15.

In the column 15 the condensate (usually called the primary product) is separated into several fractions and a fraction consisting of naphthalene oil and phenols may be drawn off through the pipe 16. This fraction is then passed to a settling tank 17 where naphthalene crystallises out and the remaining phenols together with a small quantity of other substances may be discharged from the tank 17 through the pipe 18.

The pipe 18 leads to a tank 19 which is arranged in a cycle consisting of the H2S absorber or washing apparatus 2, the pipes 21, 21a, regenerating or actifier apparatus 22, pipe 23, pump 24 and pipe 25.

The washing liquid i. e. the phenolate solution is kept in circulation through the said cycle. The phenolate solution enriched with hydrogen sulphide etc. is heated in apparatus 22 so that the acidic impurities absorbed will be driven off. They escape through the pipe 26 to be treated for further purposes.

The regenerated solution then flows to the tank 19 and is mixed there with the phenols recovered from the gases and passed to the tank 19 by means of the pipe 18 as described. Oily matter which is carried along with the phenols passed to tank 19 may be separated from the aqueous solution in the tank 19. The phenols are wholly or partly converted into alkaline phenolates which are easily soluble in water and the phenolate solution is circulated by means of the pump 24 again to the washing apparatus 2.

I have now above described my present invention on the lines of a preferred embodiment thereof but my invention is not limited in all its aspects to the mode of carrying it out as described and shown, since my invention may be variously embodied within the scope of the following claims.

I claim:

1. In a process of treating gas which comprises the steps of removing hydrogen sulphide and other acidic impurities from gases containing benzol by washing the gas with an aqueous alkaline solution of phenol, removing the phenol volatilized into the gas during the alkali phenolate scrubbing step by washing the gas to absorb the phenol from the same and returning the absorbed penol again to the alkaline solution of phenol, and removing the benzol from the gas by washing the gas with a benzol absorbent wash oil which is regenerated by steam distillation with fractionation of the distillation vapors; the improvement comprising, effecting the treatment of the gases with the alkaline phenolate solution immediately before the step for removal of benzol from the gas and effecting the extraction from the gas of the phenol that is taken up by the gas as a result of the volatilization of phenol into the same during the alkali phenolate scrubbing step by absorption of the phenol in the benzol absorption wash oil during the benzol absorption step, recovering the absorbed phenol in a fraction in the fractionation phase of the benzol wash oil regeneration step, and thereupon returning the recovered phenol to the phenolate solution for the acid gas removal step.

2. An improved process as claimed in claim 1, and in which the absorbed phenol is recovered along with the naphthalene fraction in the fractionation step, and the phenol then recovered from the naphthalene oil fraction before its return to the phenolate solution for the acid gas removal step.

3. An improved process as claimed in claim 1, and in which the absorbed phenol is recovered in the fractionation step as a part of an intermediate fraction between the benzol fractions and naphthalene, and the phenol then returned to the phenolate solution for the acid gas removal step.

ADOLF SCHMALENBACH.